Patented May 12, 1936

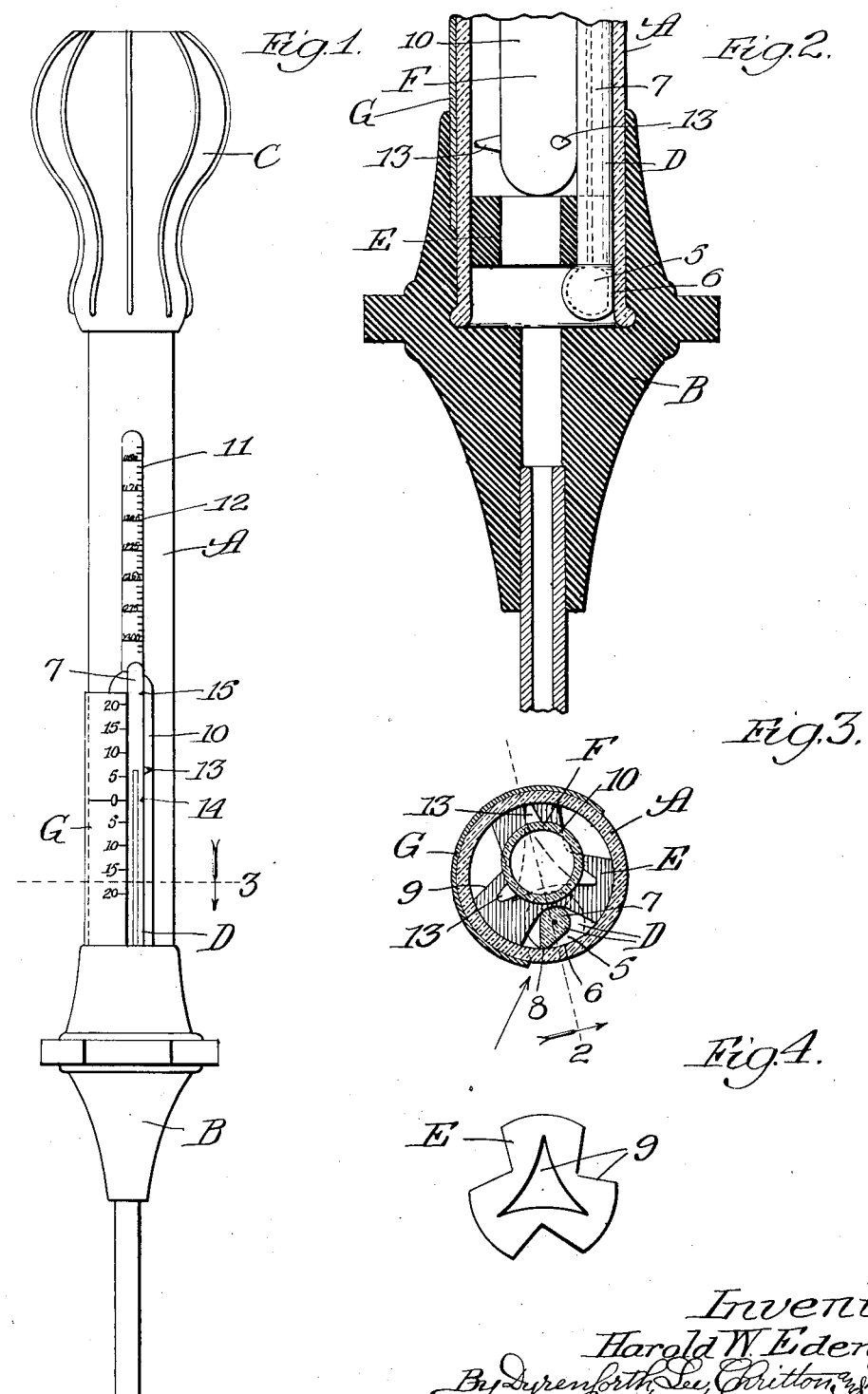

2,040,547

UNITED STATES PATENT OFFICE 2,040,547

THERMOHYDROMETER

Harold W. Eden, Chicago, Ill., assignor to Triple-A-Specialty Company, a corporation of Illinois Application December 5, 1935, Serial No. 53,040

6 Claims. (Cl. 265—46)

This invention relates to thermohydrometers adapted to indicate simultaneously the temperature and specific gravity of a liquid, and more particularly to a device indicating the amount of electrical charge in a storage battery.

The primary object of the invention is to provide a convenient and inexpensive device, which may be cleaned easily and will enable the user to determine the specific gravity of the solution and the proper correction for temperature. A further object of the invention is to provide a thermometer within the housing barrel for the hydrometer float, the thermometer having a flattened bulb portion which will enable it to be held against the inside of the barrel and having the flattened portion of the bulb positioned radially with respect to the magnifying edge portion of the thermometer capillary tube to facilitate taking its reading.

A further object of the invention is to provide the hydrometer float with pairs of outwardly extending fingers which will straddle the thermometer capillary tube and prevent rotation of the float with respect to the thermometer. This feature enable the user to take the readings on both thermometer and hydrometer float without turning the instrument.

Another object of the invention is to provide a gage which may be adjustably secured to the outside of the housing barrel and accurately positioned with respect to the thermometer.

The invention is illustrated in the preferred embodiment in the accompanying drawing, in which,—

Fig. 1 is an elevational view of a device embodying the invention; Fig. 2, a broken vertical sectional view of the lower end portion of the device; Fig. 3, a transverse sectional view taken as indicated at line 3 of Fig. 1; and Fig. 4, a plan view of the resilient plug which holds the thermometer in position.

In the embodiment illustrated, A designates a transparent housing barrel; B, a nozzle head which serves as a cap enclosure for the lower end of said barrel; C, a bulb for drawing liquid into the barrel through said nozzle-head; D, a thermometer; E, a removable resilient plug member; F, a hydrometer float; and G, an adjustable gage member adapted to be secured to the outside of the barrel A.

The glass housing barrel A, the nozzle B, and the bulb C, are all of conventional construction and need not be described in detail.

The thermometer D comprises a spirit bulb 5 which is flattened at one side as indicated at 6 to enable the thermometer to be held closely adjacent to the wall of the barrel A, and the thermometer has an upwardly extending capillary tube 7 having an angular edge portion 8 which is prism-like and magnifies the contents of the tube when viewed through the housing barrel at a proper angle, as indicated by arrow in Fig. 3.

It may be noted that the arrow, which indicates the preferred line of vision, makes an angle of about 30° with the radial section line 2. The reason for this angle is to position a larger circumferential portion of the gage member G in view when looking at the magnified spirit column, and thereby facilitate taking the reading.

The thermometer D is held in position in the bottom of the housing barrel by means of a resilient plug E preferably made of rubber and provided with perforations or cutouts 9 to permit liquid drawn through the nozzle head to pass upwardly into the float chamber. One of the cutout portions embraces the lower end of the capillary tube and holds the same securely in position.

The hydrometer float F may be of the conventional type having an enlarged lower portion 10 and a tubular upwardly extending portion 11 in which is mounted a gage 12. The lower portion 10 is provided with pairs of outwardly extending integrally formed fingers 13 preferably in sets of three with the sets in vertical alinement. These fingers serve a two-fold purpose, namely: they prevent the float from touching the walls of the barrel and sticking thereto, and they straddle the capillary tube 7 so as to prevent the float from rotating with respect to the same and thereby enable the gage 12 to be kept in substantially vertical alinement with the thermometer gage.

The gage member G is of cylindrical form having a cutaway portion at one side to enable it to be snapped around the barrel A. Preferably, the member is made of an acid resisting material such as aluminum and the gage is etched or painted with large figures to enable it to be read readily. The lower end of the member G preferably is embraced by the capped portion of the nozzle head B and is thereby held securely in position. Preferably the thermometer capillary tube is provided with a pair of marks 14 and 15 which should be in alinement with the zero mark and top edge of the gage mark G when it is properly positioned. In manufacturing devices of the character described the thermometers D vary somewhat and accordingly a number of gage members are used. However, it is merely necessary to see that the marks on the thermometer correspond with the zero reading and top edge of the gage member to be sure that a gage member of proper size has been associated with the thermometer. These marks are also useful in reassembling the device after it has been taken apart for the purpose of cleaning.

In using the device the lower end of the nozzle is inserted in the liquid to be tested and a sample of the liquid is drawn upwardly into the housing barrel by means of the bulb. A reading is taken on the gage 12 and a second reading is then taken on the gage member G. To the first reading is added the reading on G if above the zero line, or subtracted if below the zero line. This correction will enable the electrical charge in a storage battery, for example, to be determined accurately regardless of the temperature of the liquid.

The foregoing detailed description has been given for clearness of understanding only, and no unnecessary limitations should be understood therefrom but the appended claims should be construed as broadly as permissible, in view of the prior art.

I claim:

1. In a syringe hydrometer having a transparent barrel: a thermometer tube adapted to fit closely against the inside wall of said barrel; a perforate plug in the lower portion of the barrel for holding said tube in position; and a specific gravity float loosely confined in said barrel having a pair of outwardly extending fingers adapted to straddle said tube and prevent rotation of the float with respect to the tube.

2. In a device of the character set forth, a thermometer having a flattened bulb portion adapted generally to conform to and fit against the inside of a cylindrical transparent housing barrel, said thermometer having a capillary tube and a lens portion whose outer edge is in vertical alignment with the flattened bulb portion so as to fit against the inside of said barrel, and the transverse central line of said lens portion being angularly disposed with respect to the transverse central line of said flattened bulb portion so that said lens portion will magnify the contents of the tube when viewed through said barrel on a non-radial line.

3. A device as specified in claim 2, in combination with a gage member in the form of a metal clip adjustably secured to the outside of the housing barrel so as to indicate the magnifying portion of the capillary tube and facilitate reading the thermometer while more than one-fourth of the circumference of said gage member is in view.

4. In a syringe hydrometer having a transparent barrel provided at its lower end with a flexible intake cap: a thermometer having a flattened bulb and upwardly extending capillary tube fitted snugly against the inside wall of said barrel; and a gage member associated with said thermometer and adjustably secured to the outside of said barrel by means of the intake cap.

5. A device as specified in claim 4, in which the gage member is in the form of an upwardly extending metallic clip adapted to snap onto said barrel.

6. In a syringe hydrometer having a transparent barrel provided at its lower end with a resilient intake cap: a thermometer having a flattened bulb portion and an upwardly extending capillary tube adapted to fit against the inside wall of said barrel; and a resilient plug having a plurality of similar cutouts in its circumference, said plug being adapted to be slipped into said barrel above the thermometer with any one of said cutouts embracing said tube and holding the thermometer in position.

HAROLD W. EDEN.